MAGNETIC TAPE REPRODUCING DEVICE

Original Filed Jan. 12, 1966 3 Sheets-Sheet 1

INVENTORS
WILLIAM B. HUBER
CHARLES E. LYON JR.
ROBERT A. WOLF
BY Mueller, Aichele & Rauner
ATTORNEYS Nov. 17, 1970 C. E. LYON, JR., ET AL 3,541,273
MAGNETIC TAPE REPRODUCING DEVICE
Original Filed Jan. 12, 1966 3 Sheets-Sheet 2
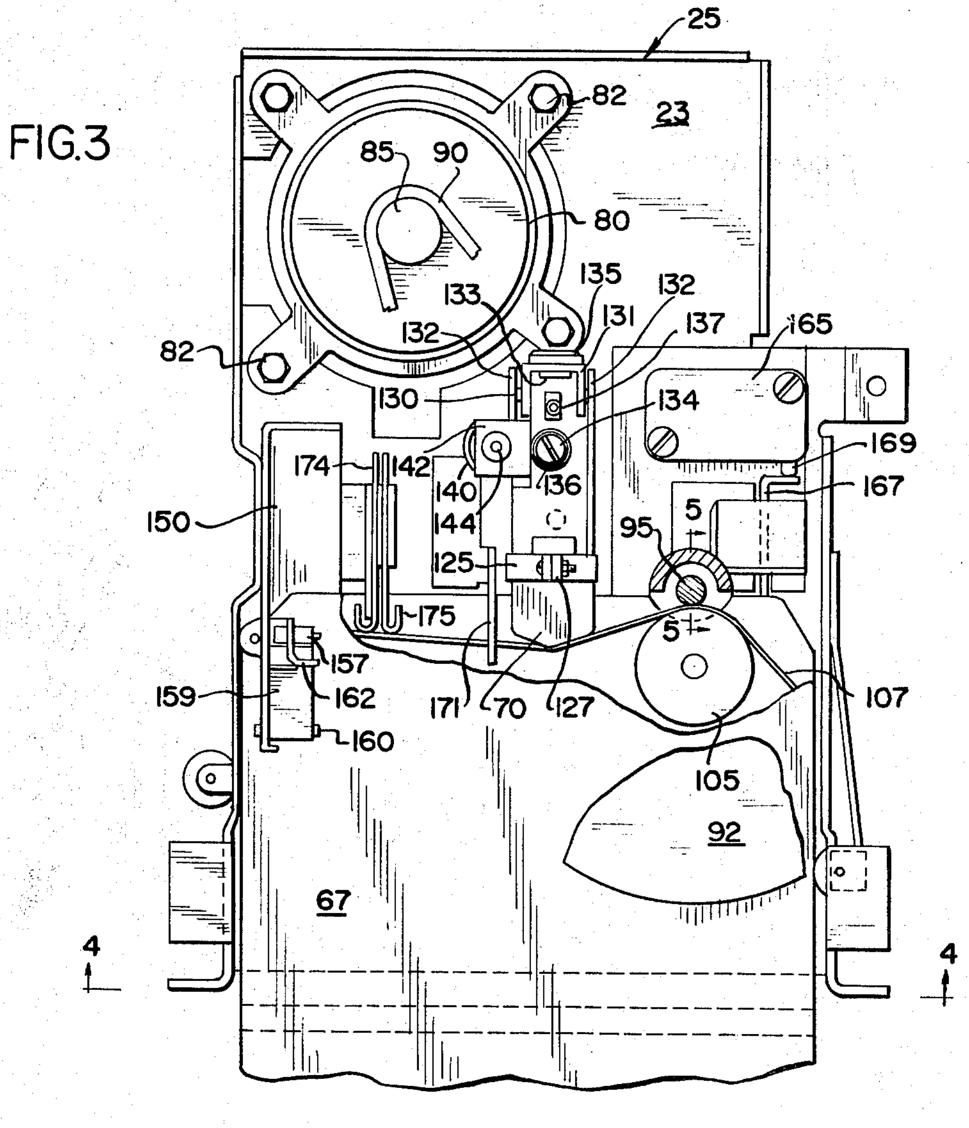
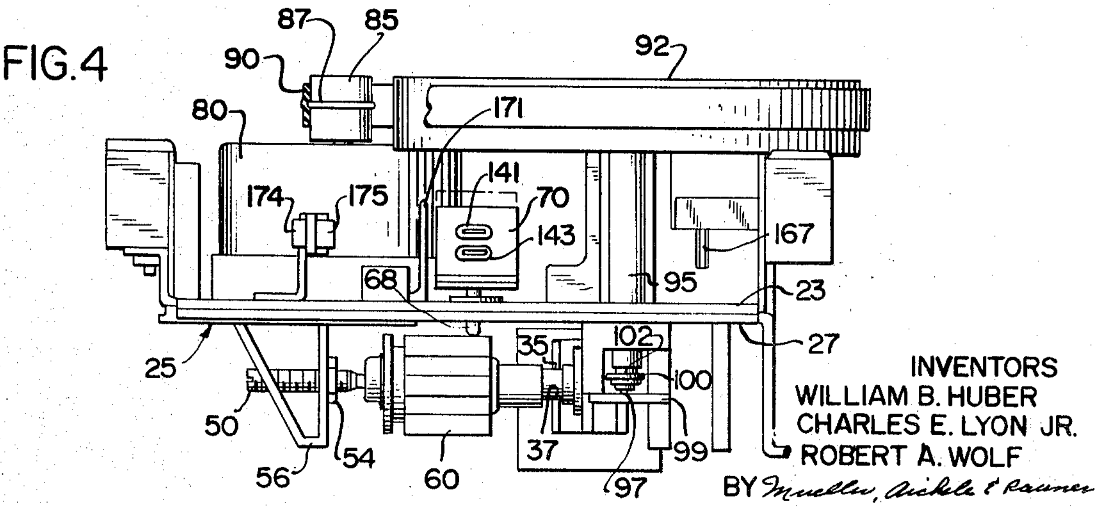
FIG. 4
INVENTORS
WILLIAM B. HUBER
CHARLES E. LYON JR.
ROBERT A. WOLF
BY Mueller, Aichele & Rauner
ATTORNEYS INVENTORS
WILLIAM B. HUBER
CHARLES E. LYON JR.
ROBERT A. WOLF
BY Mueller, Aichele & Rauner
ATTORNEYS United States Patent Office
3,541,273
Patented Nov. 17, 1970

3,541,273
MAGNETIC TAPE REPRODUCING DEVICE

Charles E. Lyon, Jr., Des Plaines, William B. Huber, Park Forest, and Robert A. Wolf, Oak Lawn, Ill., assignors to Motorola, Inc., Franklin Park, Ill., a corporation of Illinois Continuation of application Ser. No. 520,169, Jan. 12, 1966, which is a continuation-in-part of application Ser. No. 487,996, Sept. 17, 1965. This application Aug. 25, 1969, Ser. No. 859,494
Int. Cl. G11b *5/56, 21/12, 21/24*
U.S. Cl. 179—100.2 3 Claims

ABSTRACT OF THE DISCLOSURE

In a cartridge-type tape player, a solenoid has the extended end of the core thereof supported by a coupling member to which is resiliently attached a pawl. The pawl is spring biased into contact with a ratchet wheel on a cam shaft. Upon the completion of playing of one track on the tape, the solenoid is energized to move the core against the spring bias to disengage the pawl from the ratchet wheel. With the solenoid being de-energized, the spring biases the pawl back into engagement with the ratchet wheel to advance the same moving the cam to position the tape head to play another track on the tape. The tape head is mounted to the tape deck by a mounting which includes an azimuth adjustment pivot and a track index axis which lie in a common plane passing through the center of the tape head, and a track adjustment screw which is positioned on the center line of the head in line with the azimuth pivot so that alignment in one direction by varying one of the adjustments will not affect the alignment control by the remaining adjustments.

This application is a continuation of copending application Ser. No. 520,169, filed Jan. 12, 1966, now abandoned. Copending application 520,169 was a continuation-in-part of application Ser. No. 487,996, filed Sept. 17, 1965 which is still pending.

This invention pertains generally to cartridge tape players and more particularly to the operating apparatus of such a player.

The operating apparatus proposed for cartridge tape players to be produced in combination with a radio for use in an automobile have generally been complicated resulting in objectionably large units which have been relatively expensive to manufacture. Further such units have not had the stability and ruggedness necessary for operating under the conditions of vibration and shock encountered in an automobile.

One object of this invention is to provide improved simplified cartridge tape player apparatus that is compact and rugged and can be combined with a radio for installation into an automobile.

Another object of this invention is to provide an automatic positioning structure for the magnetic tape head used in cartridge tape player apparatus that is relatively simple and inexpensive to manufacture.

Additional problems have also been encountered in the proposed players. For instance, in the mechanism for driving the tape in the cartridge, the capstan shaft which engages the pinch roller to move the tape, in many instances, has been of the cantilever type. This permits the free end of the shaft to flex when the unit is jarred thereby varying the rate of the tape through the cartridge and causing a certain amount of "wow" and "flutter" in the reproduced sound. Furthermore, the belt from the motor to the capstan has had a tendency towards induced harmonic motion which causes "wow" and "flutter" and also has a tendency to ride off of the motor driven barrel roller when the tape player is first energized.

Another object of this invention is to provide an improved cartridge tape player that provides a unique mounting for the capstan shaft to eliminate "wow" and "flutter" in the reproduced sound caused by a flexing motion of the shaft.

A further object of this invention is to provide an improved cartridge tape player that uses a capstan drive belt which eliminates "wow" and "flutter" commonly induced by such belts and which is maintained on the barrel roller when the tape player is energized.

One feature of this invention is a cartridge-type tape player wherein the magnetic tape head is positioned by a cam follower which engages a cam having a plurality of different cam surfaces associated with different tracks on the tape. A solenoid has the extended end of the core or plunger thereof supported by a mounting to which is resiliently attached a pawl. The pawl is spring biased into contact with a ratchet wheel on the cam shaft. Upon the completion of one tape track, the solenoid is energized to move the core against the spring bias to disengage the pawl from the ratchet wheel, and it is then de-energized so that the spring biases the pawl back into engagement with the ratchet wheel to advance the same. Movement of the wheel turns the shaft to rotate the cam so that another cam surface engages the cam follower for automatically positioning the tape head to play a different track on the tape.

Another feature of this invention is apparatus for an automatic cartridge-type tape player wherein the mounting for the magnetic tape head includes an azimuth adjustment pivot and a track index axis which lie in the same plane through the center of the tape head, and a track or altitude adjustment screw which is positioned on the center line of the head in line with the azimuth pivot so that alignment in one direction by varying one of the adjustments will not affect the alignment controlled by the remaining adjustments.

Still another feature of this invention is apparatus for an automatic cartridge-type tape player wherein the capstan shaft which engages the tape in the cartridge to move the same is supported above and below the tape to prevent flexing of the shaft.

A further feature of this invention is apparatus for an automatic cartridge-type tape player having a flat drive belt between the barrel pulley, which is driven by the tape player motor, and the capstan, and having a rib portion circling the girth of the barrel pulley which acts to prevent the flat belt from riding off the pulley when energizing the tape player.

Still another feature of the invention is apparatus for a cartridge-type tape player having contacts which continuously engage the tape and which are closed by a conducting strip at the end of one channel of the tape to energize the solenoid to move the magnetic tape head to position it to play a different channel of the tape.

In the drawings:

FIG. 3 is a plan view of the top of the tape deck with the tape cartridge in place;

FIG. 4 is a front elevation of a section of the tape deck taken along line 4—4 of FIG. 3 with the cartridge removed;

In accordance with this invention, a stereophonic cartridge tape player is combined with a radio receiver for installation in an automobile. The tape player includes a cam which has a plurality of cam surfaces for positioning the magnetic tape head. A cam follower selectively contacts the cam surfaces and extends to the tape head to position the same. A pair of contacts continuously engage the moving tape, and at the completion of one track, a conducting strip bridges the contacts to energize a solenoid mounted on the tape deck. The solenoid acts through mechanical linkage to rotate the cam to position another cam surface in contact with the cam follower for playing another track on the tape. The sound head of the mechanism is mounted with the azimuth adjustment pivot and the track index axis lying in the same plane, and the track adjustment or altitude screw positioned on the center line of the head in line with the azimuth adjustment pivot so that an adjustment of one of the variable settings will not affect the alignment controlled by the remaining settings. A flat drive belt is looped around a barrel pulley driven by the tape player motor and is connected to the capstan shaft. A rib portion about the girth of the barrel pulley prevents the flat belt from riding up off the pulley when the tape recorder is energized. The capstan shaft and the pinch roller are in engagement with the tape passing therebetween so that rotation of the capstan shaft moves the roller to drive the tape within the cartridge. The capstan shaft is supported on either side of the pinch roller to prevent flexing of the shaft which could cause variations in the speed of the tape passing the sound head, thereby inducing a "wow" and "flutter" in the reproduced sound.

Figures 1, 2:
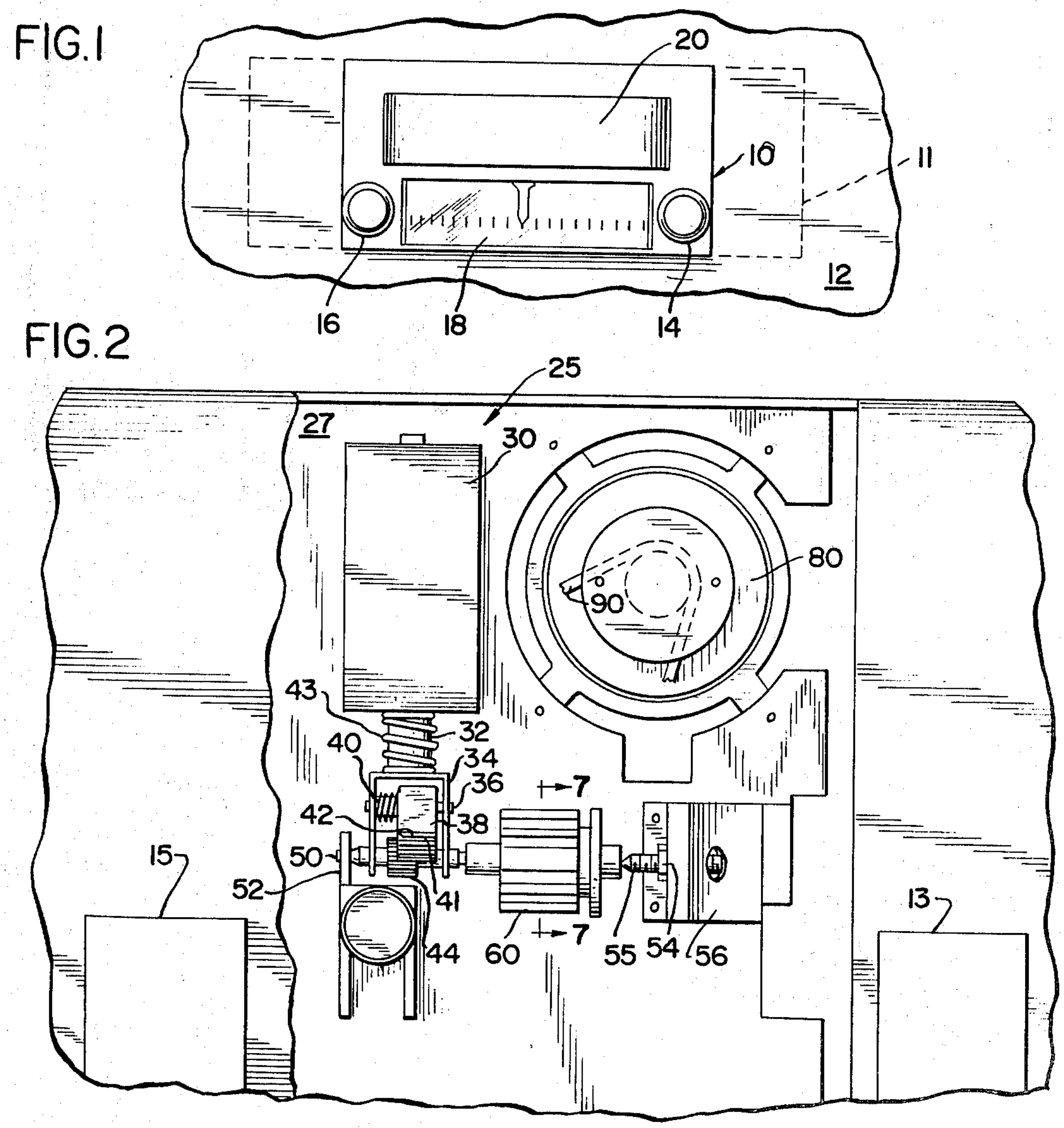
FIG. 1 is a front elevation of the combined radio and tape player of this invention for mounting in an automobile.
FIG. 2 is a partial plan view of the bottom of the radio tape player combination with a portion cut away to expose the tape deck.

Referring to the drawings, FIG. 1 shows a stereophonic radio and cartridge tape player combination 10 having a single chassis 11 and mounted in the dashboard 12 of an automobile. The radio has an RF amplifier section 15 and an audio amplifier section 13 (FIG. 2) and is tuned by knob 14. The off-on control and volume for both the radio and tape player is controlled by knob 16. The radio has a dial 18 for indicating the station tuned by knob 14. The pivoted panel 20 provides access for the tape cartridges that are inserted into the cartridge receiving area of the tape player.

FIGS. 2 through 4 show the tape deck 25 of the tape player in greater detail. Mounted to the bottom 27 (FIG. 2) of the tape deck 25 is a solenoid 30. The extended end or plunger 32 of the core of solenoid 30 is connected to a support bracket 34. A pin 36 extends between the walls of the bracket 34 and pivotally supports the pawl 38. The end 41 of spring 40, which is supported by pin 36, is received in groove 42 of the pawl 38. The spring serves to resiliently bias the pawl 38 into the surface of the teeth of the ratchet wheel 44. The bottom portion (not shown) of the pawl 38 engages the teeth of the ratchet wheel 44, in a known manner, to prevent the force of the spring 40 acting through the pawl 38 from turning the ratchet wheel 44. A spring 43 encircles the extended portion 32 of the solenoid 30 and biases the bracket 34, hence pawl 38, into engagement with ratchet wheel 44. A shaft 50 is rotatably supported by mounting 52 on one end. A threaded cup set screw 55 bears against a ball bearing (not shown) at the opposite end of the shaft 50 and is tightened against bracket 56 by nut 54 to hold the shaft in position. The ratchet wheel 44 is secured to the shaft 50 in such a manner that rotation of the wheel 44 will cause rotation of the shaft 50. Even with the plunger 32 of the solenoid 30 drawn into the coil thereof, the walls 35 and 37 (FIG. 4) of the slot in bracket 34 slide on the shaft 50 and the bracket 34 is still supported therein.

A substantially cylindrical shaped cam 60 is also mounted coaxially to the shaft 50 by a key 62 (FIG. 7) engaging a keyway on the shaft 50. Therefore, the cam 60 rotates with the shaft 50 in the same manner as ratchet wheel 44. The cam 60 as shown is used with an eight track cartridge. A cam follower 68 (FIGS. 4 and 6) rides on the cam surfaces of the cam 60. The cam follower 68 passes through the tape deck 25 to engage the magnetic head 70 and acts to position that member as will be described subsequently.

Figure 7:
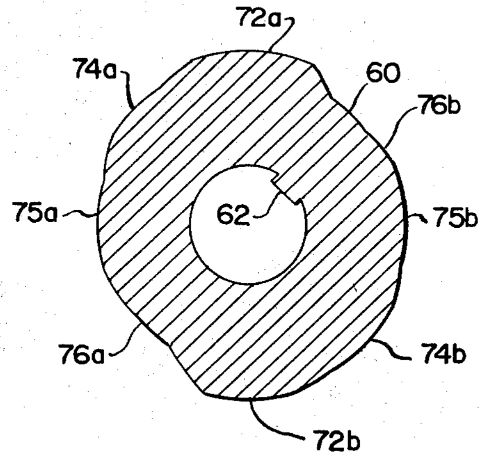
FIG. 7 is an expanded cross-section taken along line 7—7 of FIG. 2.

Because this particular embodiment of the invention is being described as a stereophonic cartridge-type tape player, two tracks on the tape will be played simultaneously to provide stereophonic reproduction. Therefore, in order to properly position the tape head 70 for use with the eight track cartridge 67, for instance, four different cam surfaces would be required. FIG. 7 shows the cam surfaces for use with the eight track cartridge 67. They are *72a*, and *72b*, *74a* and *74b*, *75a* and *75b*, and *76a* and *76b*. Identical surfaces such as *72a* and *72b* are provided so that wherever the cam 60 is positioned by the pawl 38 when the eight track cartridge 67 has been placed in the tape player, the cam follower 68 will contact an operable cam surface to position the magnetic tape head 70 to play two tracks of the tape simultaneously. In addition, by having like pairs of cam surfaces the motion required to rotate the cam between tracks is limited.

The details of the top 23 of the tape deck 25 can best be seen in FIG. 3. An electric motor 80 is secured to deck 25 by fasteners 82. A barrel pulley 85 is driven by the motor 80. The barrel pulley 85 has a rib portion 87 (FIG. 4) circling the girth of the pulley. A flat belt 90 connects the pulley 85 to the flywheel 92 for advancing the tape in the cartridge. The flat belt is used because it eliminates the tendency towards induced harmonic motion which is found in other belt types such as O-rings. The rib portion about the girth of the barrel pulley 85 engages the flat belt 90 and prevents the belt from riding up off the pulley 85 when the tape player is energized.

Figure 5:
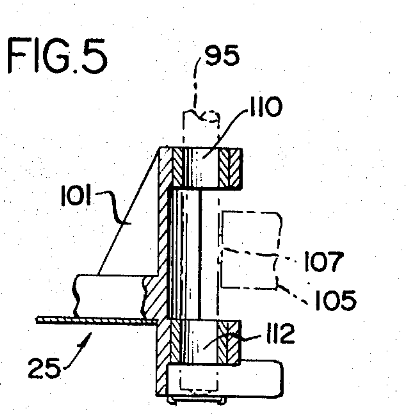
FIG. 5 is a side elevation of a section taken along the lines 5—5 of FIG. 3 with the capstan shaft and pinch roller shown in phantom.

The flywheel 92 is rotatably supported by a capstan shaft 85 which extends through a cylindrical opening in the deck 25 and has a thrust bearing 97 (FIG. 4) at the end thereof that butts against the bottom plate 99 of the capstan housing 10 (FIG. 5). The capstan shaft 95 is secured against axial movement by pin 100 which fits in the annular groove 102. The capstan shaft 95 engages the pinch roller 105 that is located in the cartridge 67. The magnetic tape 107 is then frictionally compressed between the pinch roller 105 and the capstan shaft 95. In previous tape recorders there has been a problem with the capstan shaft 95 flexing at the pinch roller, because it was of a cantilever construction, whereby it is only supported at the bottom of the shaft. It is important to note, therefore, that in this tape device the capstan shaft 95 is supported by bearings 110 and 112 (FIG. 5) on the top and bottom of the pinch roller 105 as indicated by the dotted lines in FIG. 5. By rigidly mounting the capstan shaft 95 in this manner, flexing of the shaft is prevented which eliminates any "wow" and "flutter" in the reproduced sound that might posssbly be generated in the shaft because of the flexure by insuring that the capstan shaft will drive the tape through the cartridge at an even rate.

Figure 6:
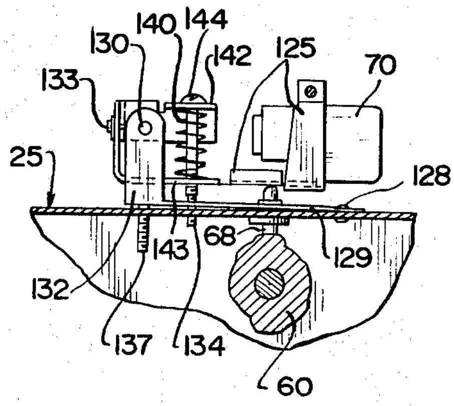
FIG. 6 is a side elevation of the tape head mounting mechanism.

The magnetic tape head 70 is positioned on the tape deck 25 so that it can be adjusted both in azimuth and altitude, in order to align it properly with the stereo channels on the tape. FIGS. 3 and 6 illustrate the manner is which the tape head 70 is mounted. The pick-up head 70 is clamped to the head bracket 125 by adjustable clamp 127. The head bracket 125 is then pivotally mounted to U-shape azimuth bracket 131 by azimuth adjustment pivot pin 133. The pivot pin 133 is secured against linear movement by a spring washer 135 and lies on the center of the head 70 between the two pole pieces 141 and 143

(FIG. 4). The U-shaped bracket 131 in turn is pivotally mounted about track index axis 130 that extends between support bracket 132, which has a resilient base 129 fixedly mounted at its front edge on the center line of the head 70 to the tape deck 25 at 128. A screw 137 is connected to the resilient base 129 and passes through the center line of the base and the head 70. The screw is threaded through the tape deck 25 and is the track index adjustment screw. Moving the screw 137 in one direction causes the support bracket 132 to follow the movement and to be positioned relative to the tape deck 25 to raise the sound head 70 in elevation, while movement of the screw in the opposite direction positions the bracket 132 to lower the sound head. A screw 134 is threaded to the head bracket 125 and the tape deck 25. A spring 136 encircles the screw 134 and is compressed between the screw head and the head bracket 125. The spring 136 serves to bias the sound head 70 against the cam follower 68. A second spring 140 is compressed between plate 142, which is integral with U-shaped bracket 131, and a plate 143 that is integral with the head bracket 125. A threaded azimuth adjustment screw 144 extends between the plate. By adjusting the screw, the tension on spring 140 can be varied to cause the head bracket 125 to pivot around pivot pin 133 to provide a fine adjustment in azimuth for the tape head 70. The head 70 is supported from underneath by the cam follower 68 and moves up and down in an arc about the track index axis 130. The amount of movement depends on the particular cam surface with which the follower is in contact, and the head is therefore positioned in this manner to align the same with the tape tracks associated with that particular cam surface in contact with the cam follower 68.

It should be noted that the track index axis 130 and the pivot pin 133 both lie in the same plane, and the track adjustment or altitude screw 137 is positioned on the center line of the head 70 in line with azimuth pivot 133. With this relationship of the pivot points, varying one of the settings, for instance, the track adjustment or altitude screw will not affect the azimuth adjustment because they both lie on the center line of the head 70. Likewise, because the track index axis 130 and the azimuth pivot 133 lie in the same plane, movement of the head 70 by the cam follower 68 about axis 130 will not affect the azimuth setting.

Figure 8:
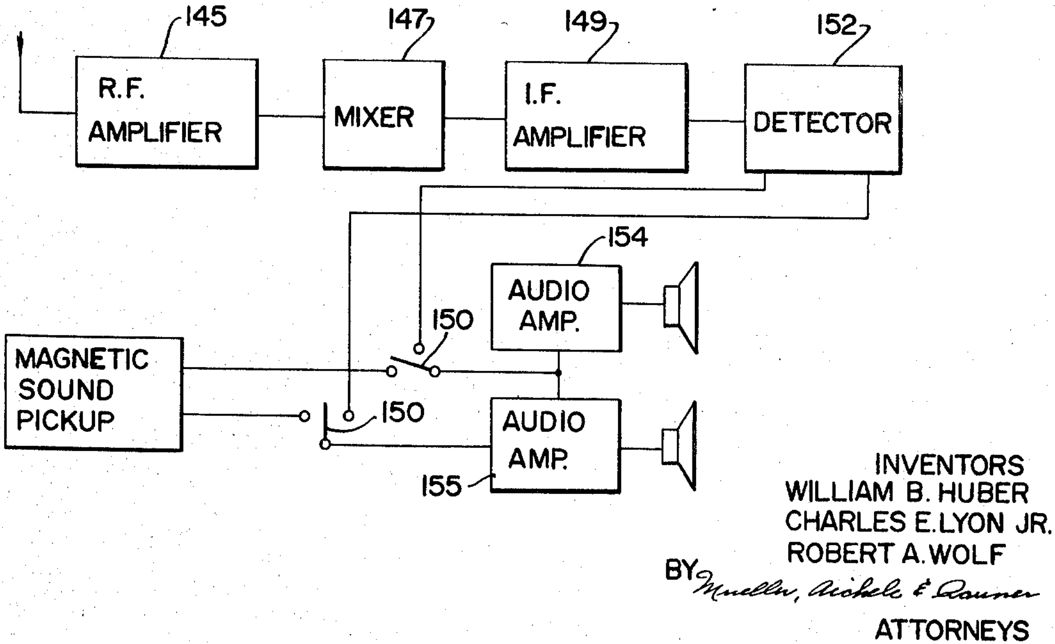
FIG. 8 is a block diagram of the radio and tape player of this invention.

Two switches are also located on the top 23 of the tape deck 25, and both are operated by the tape cartridge when it is inserted into the tape player. Switch 150 is used to decouple the right and left stereo signals from the detector 152 of the radio shown in FIG. 8 to the stereo audio amplifiers 154 and 155. In addition to the detector 152, the radio includes an RF amplifier 145, a mixer 147, and an IF amplifier 149. The switch 150 then couples the right and left stereo signals from the magnetic tape head 70 to the audio amplifiers 154 and 155. The switch is actuated by the tape cartridge 67 being inserted into the player and striking a roller 157. The roller is connected to arm 159 which pivots about axis 160. As the arm 159 pivots, it engages the plunger 162 and moves it into the switch 150 to cause the switching action.

The second switch 165 operates to energize the circuits of the tape player including the motor 80. This switch 165 is actuated by the leading edge of the tape cartridge contacting the plunger 167 and moving it against the actuating plunger 169 of the switch 165. Both arm 159 and plunger 167 are spring biased so that upon removal of the cartridge from the tape player, the player circuits are deenergized, and the stero signals from the radio detector 152 are once again coupled to the audio amplifiers 154 and 155.

In operation, the cartridge 67 is inserted into the tape player. An alignment member 171 engages the tape cartridge and the tape 107 therein, aligning the tape with the magnetic sound pickup head 70. The tape head 70 enters an aperture in the tape cartridge and rests against the tape. The contacts 174 and 175 pass through the aperture in the tape cartridge and contact the tape. The contacts connect the power supply to the solenoid 30 and are normally open. The switches 150 and 165 are actuated by placing of the cartridge into the player as heretofore described. When the tracks on the tape associated with the cam engaging the cam follower 68 have been completed, a small aluminum contact strip that completes the loop of the tape bridges across the contacts 174 and 175 that are spaced in the direction of movement of the tape thereby completing the circuit to the solenoid 30 and energizing the same. The solenoid 30 then operates the pawl 38 in the manner heretofore described to rotate the cam 60 to position another cam surface in contact with the cam follower 68. The cam follower 68 then reacts to swing the tape head 70 about the axis 130 to reposition the tape head for playing the next two stero tracks on the tape 107.

What has been described is an improved, compact and rugged cartridge type tape player mechanism. The mechanism includes an automatic positioning structure for the magnetic tape head that is relatively simple and inexpensive to manufacture, a unique mounting for the capstan shaft that eliminates "wow" and "flutter" in the reproduced sound caused by a flexing motion of the shaft and that uses a capstan drive belt which eliminates "wow" and "flutter" and which is positively maintained on the barrel roller when the tape player is energized.

What is claimed is:

1. Electronic apparatus including a cartridge-type tape player adapted to receive and play tape cartridges having a multi-track tape therein which is positioned to be engaged by the apparatus to drive the tape therethrough, said apparatus including in combination, a magnetic tape head, cam means including a plurality of different cam surfaces, each different cam surface being associated with a different track on the tape, a cam follower selectively contacting one of said cam surfaces and being connected to said tape head for positioning the same, cam rotating means for rotating said cam to position a different one of said cam surfaces in contact with said cam follower, and mounting means for said magnetic tape head, said mounting means including an azimuth adjustment pivot for adjusting said tape head in azimuth, a track index axis about which said tape head is rotatingly tilted between the different tracks on the tape, and a track index adjustment screw for adjusting the alignment of said head to the individual tracks, said azimuth pivot and said track index axis substantially lying in a common plane passing through the center of said tape head, and said track adjustment screw and said azimuth pivot positioned on the center line of said magnetic tape, so that with aligning said magnetic tape head in azimuth by rotating the same about said azimuth pivot said altitude adjustment remains unchanged, and tilting said magnetic tape head about said track index axis between the different tracks of the tape by said cam follower and aligning said head to the individual tracks with said track adjustment screw, said azimuth adjustment remains unchanged.

2. The electronic apparatus of claim 1 wherein said cam rotating means includes a shaft mounted on said tape deck and having a cam rotatingly mounted thereon, coupling means on said shaft, electromechanical actuating means, and linking means connecting said electromechanical actuating means to said shaft through said coupling means, said electromechanical actuating means being energized with the completion of playing of one of the tracks on the tape to move said shaft to position a different cam surface into contact with said cam follower thereby positioning said magnetic tape head to play a different track of the multi-track tape.

3. The electronic apparatus of claim 1 wherein said mounting means further includes a head bracket clamped to said tape head, an azimuth bracket, said head bracket being pivotally mounted to said azimuth bracket by said azimuth adjustment pivot, a support bracket having an integral resilient base fixedly mounted at one end thereof, said track index axis being rotatably mounted to said support bracket, said azimuth bracket being pivotally mounted to said support bracket about said track index axis, track index adjustment means connected to said base of said support for moving the same about said fixed end to provide an altitude adjustment for said tape head, azimuth adjustment means for rotating said head bracket about said azimuth pivot, and bias means connected to said head bracket for biasing said tape head into contact with said cam follower.

References Cited

UNITED STATES PATENTS

| | | | |
|---|---|---|---|
| 2,898,409 | 8/1959 | Tiger | 179—100.2 |
| 3,018,935 | 1/1962 | Maddock | 226—190 |
| 3,301,564 | 1/1967 | Platt | 274—11 |

STANLEY M. URYNOWICZ, Jr., Primary Examiner

R. F. CARDILLO, Jr., Assistant Examiner

U.S. Cl. X.R.

179—100.11

UNITED STATES PATENT OFFICE

CERTIFICATE OF CORRECTION

Patent No. 3,541,273 Dated November 17, 1970

Inventor(s) Charles E. Lyon, Jr., et al.

It is certified that error appears in the above-identified patent and that said Letters Patent are hereby corrected as shown below:

Column 6, line 51, "magnetic tape" should read -- magnet tape head --.

Signed and sealed this 25th day of July 1972.

(SEAL)
Attest:

EDWARD M.FLETCHER,JR.
Attesting Officer

ROBERT GOTTSCHALK
Commissioner of Patent